United States Patent [19]
Petit

[11] Patent Number: 5,584,996
[45] Date of Patent: Dec. 17, 1996

[54] APPARATUS AND METHOD FOR DISTRIBUTING LIQUID CONTAINING EVOLVABLE GLASS INTO A FLUIDIZED BED OF A REACTOR

[75] Inventor: Pete Petit, Waukesha, Wis.

[73] Assignee: Envirex Inc., Waukesha, Wis.

[21] Appl. No.: 64,497

[22] Filed: May 19, 1992

[51] Int. Cl.$^6$ .......................... B01D 24/24; B01D 24/26
[52] U.S. Cl. .................. 210/274; 210/150; 210/275; 210/279; 210/291; 210/293; 210/617; 422/140
[58] Field of Search ................................ 210/291, 758, 210/274, 275, 293, 279, 150, 151, 617, 618; 422/129, 139, 140; 261/97

[56] References Cited

U.S. PATENT DOCUMENTS

| | | | |
|---|---|---|---|
| 471,811 | 3/1892 | Deutsch | 210/274 |
| 1,998,279 | 4/1935 | Hungerford | 210/274 |
| 2,786,801 | 3/1957 | McKinley et al. | 196/53 |
| 3,322,284 | 5/1967 | Moore | 210/274 |
| 3,541,000 | 11/1970 | Hanson et al. | 208/108 |
| 3,785,779 | 1/1974 | Li et al. | 261/124 |
| 3,879,287 | 4/1975 | Porter | 210/33 |
| 3,957,443 | 5/1976 | Strickland et al. | 208/153 |
| 3,969,081 | 7/1976 | Jackson | 159/13.4 |
| 4,094,790 | 6/1978 | Schmidt, Jr. | 210/289 |
| 4,098,695 | 7/1978 | Novotny | 210/85 |
| 4,126,539 | 11/1978 | Derr, Jr. et al. | 422/212 |
| 4,170,626 | 10/1979 | Cutter et al. | 422/143 |
| 4,202,774 | 5/1980 | Kos | 210/274 |
| 4,233,269 | 11/1980 | Kaye et al. | 261/114.2 |
| 4,379,050 | 4/1983 | Hess et al. | 210/291 |
| 4,412,003 | 10/1983 | Evans | 210/197 |
| 4,462,262 | 7/1984 | Kahnke | 73/861.05 |
| 4,464,262 | 8/1984 | Owens et al. | 210/291 |
| 4,477,393 | 10/1984 | Kos | 210/170 |
| 4,547,286 | 10/1985 | Hsiung | 210/274 |
| 4,559,132 | 12/1985 | Kuehler | 261/94 |
| 4,579,647 | 4/1986 | Smith | 208/111 |
| 4,581,143 | 4/1986 | Pepper, III | 210/617 |
| 4,668,405 | 5/1987 | Boze | 210/274 |
| 4,836,989 | 6/1989 | Aly et al. | 422/195 |
| 5,062,958 | 11/1991 | Bateson et al. | 210/617 |
| 5,080,793 | 1/1992 | Urlings | 210/617 |
| 5,156,738 | 10/1992 | Maxson | 210/274 |
| 5,193,584 | 3/1993 | Watts | 137/625.33 |
| 5,372,712 | 12/1994 | Petit | 210/195.3 |
| 5,411,660 | 5/1995 | Mazewski et al. | 210/194 |
| 5,413,710 | 5/1995 | Roberts et al. | 210/291 |

FOREIGN PATENT DOCUMENTS

| | | | |
|---|---|---|---|
| 1261320 | 1/1972 | United Kingdom | 210/291 |

OTHER PUBLICATIONS

Mitsui, Zousen Engineering, No. 279 (C–257) [1716] Dec. 20, 1984, "Multi column–Type Packed Tower".

Primary Examiner—Virginia Manoharan
Attorney, Agent, or Firm—Michael, Best & Friedrich

[57] ABSTRACT

A reactor for treating a liquid containing evolvable and entrained gas has a vessel for containing a bed of particulate media, and a liquid flow distributor mounted in the vessel that includes a manifold connected to receive liquid and introduce it into the bed. The manifold includes a liquid conveying passage having an upper region where any gas that evolves from the liquid can collect and at least one discharging nozzle having an inlet in open communication with the upper region for receiving the liquid, evolved gas or a mixture thereof, and an outlet for uniformly discharging the liquid, gas or mixture thereof into the bed. A method for treating a liquid containing evolvable and entrained gas includes the steps of providing a reactor vessel having a bed of particulate media and a manifold with a liquid conveying passage having a lower region wherein liquid predominates and an upper region wherein evolved gas can collect; introducing the liquid into the passage; providing a discharging nozzle in the manifold having a nozzle inlet located in open communication with the upper region; introducing liquid, evolved gas, or a mixture thereof into the nozzle inlet only from the upper region to avoid coalescing of gas into large pockets; passing the liquid, evolved gas or mixture thereof generally downward through the nozzle outlet into the reactor bed; passing the liquid, gas or mixture through the bed of the reactor to treat the liquid; and removing treated liquid from the reactor.

6 Claims, 1 Drawing Sheet

U.S. Patent    Dec. 17, 1996    5,584,996
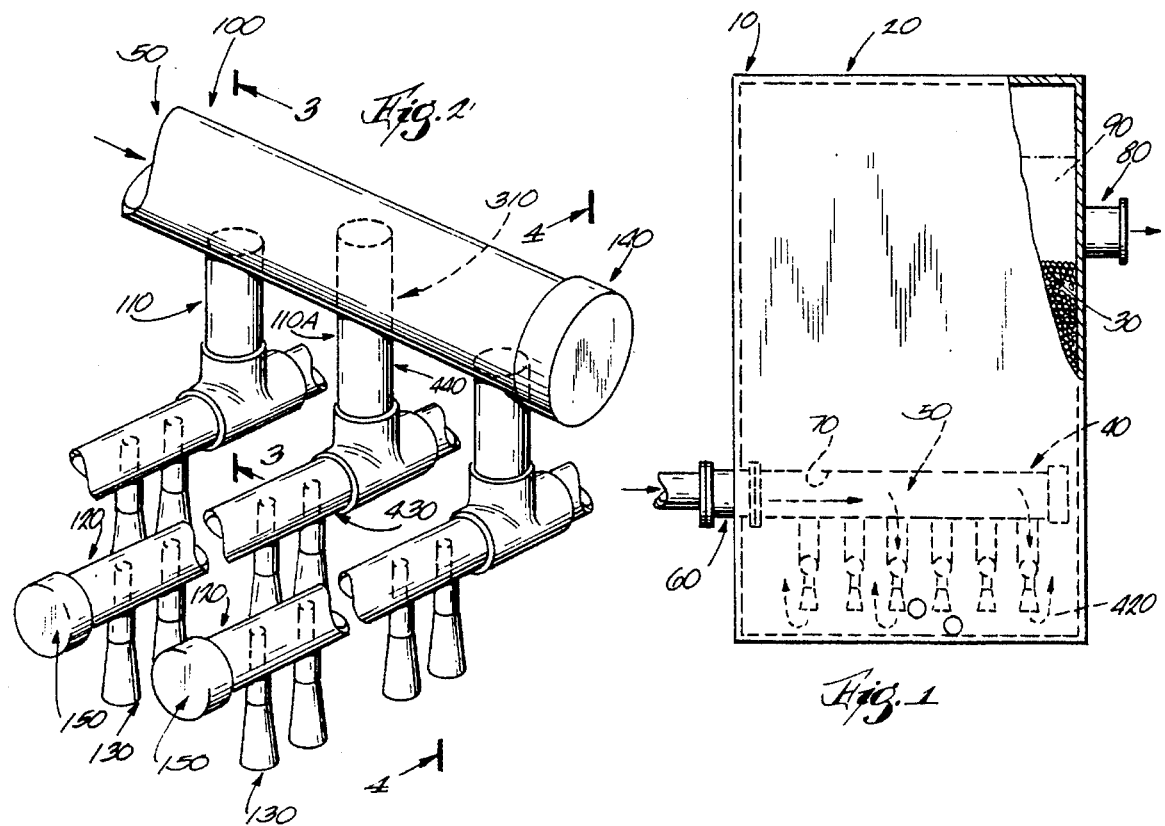
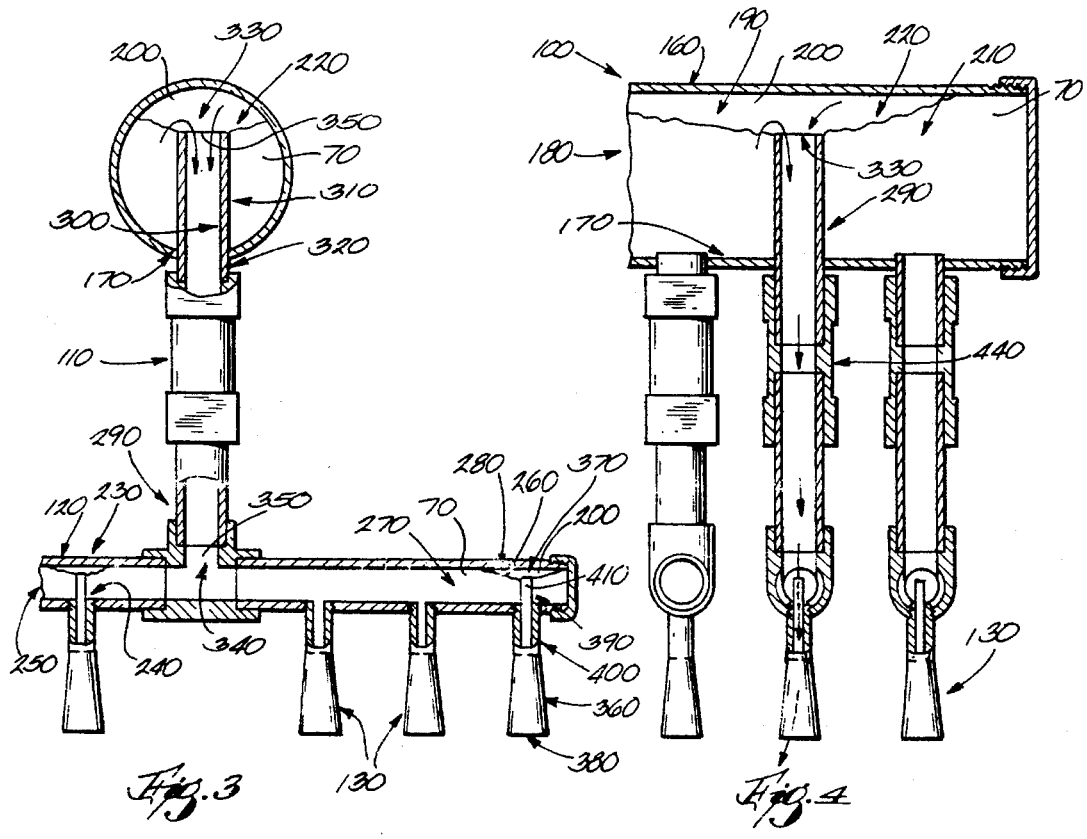

APPARATUS AND METHOD FOR DISTRIBUTING LIQUID CONTAINING EVOLVABLE GLASS INTO A FLUIDIZED BED OF A REACTOR

FIELD OF THE INVENTION

The invention relates to flow distributors for supplying liquids to fluidized bed reactors. More specifically, it relates to flow distributors for supplying liquids containing evolvable and entrained gases to fluidized bed reactors.

REFERENCE TO PRIOR ART

Fluidized bed reactors are employed in many circumstances, such as for biological treatment of waste water and other liquids. The term "liquid" as used herein, is intended to include in addition to liquids per se, any freely flowable substance such as liquid/material suspensions capable of treatment in a fluidized bed reactor. Fluidized bed reactors generally include a bed of particles of a media, such as sand, contained in a reactor vessel. In the case of reactors for biological treatment of waste water, the biological growth generally resides on the particles of media and feeds on the passing waste water, and as a result, purifies it. As liquid flows through the media, it causes the particles of media to be fluidized. Such fluidized particles provide a large surface area exposed to the liquid. Therefore, when the particles in a biological treatment bed are fluidized, a very large area of the biological growth is exposed to the liquid being treated. A greater area of biological growth exposed to the waste water results in higher treatment efficiency.

Fluidized bed reactors generally operate efficiently when the supply of liquid to the bed is uniformly distributed, uninterrupted and does not excessively disturb the media in the bed. This is particularly true for biological reactors, where the biological growth grows on a media such as sand, because an uninterrupted and uniformly distributed supply of waste water containing dissolved oxygen is required to maintain biological growth throughout the bed. Failure to continuously supply waste water containing dissolved oxygen to an area of the bed can change the nature and type of biological growth in that area, decreasing the efficiency of the reactor for treating the waste water. In addition, excessive agitation of the media by the liquid or released gases can cause the particles of media to abrade and collide, and cause the biological growth to detach and be lost into the liquid, so the treatment efficiency of the reactor decreases.

Flow distributors are employed to provide a uniformly distributed and uninterrupted supply of liquid to such fluidized bed reactors. Such flow distributors are generally submerged near the bottom of the reactor to create liquid flow upward through the media. Many liquids supplied through such flow distributors contain evolvable and entrained gases, such as dissolved nitrogen. When the liquid passes through the flow distributor, the gases may evolve and collect at various points in the flow distributor. For example, evolved gases often collect at the ends and in upper portions of the liquid conveying passages of supply tubes. Gases may also collect at points where one supply tube connects to another, such as where a downcomer tube connects to a lateral supply tube, or where a lateral supply tube connects to a discharging nozzle.

Collection of gas in the liquid conveying passages of supply tubes can adversely affect operation of such flow distributors in various respects. For example, transfer ports leading from a liquid conveying passage of one supply tube to the liquid conveying passage of another supply tube, or discharging nozzle ports leading to a discharging nozzle, can become partially filled with pockets of accumulated gas, so that liquid flow through such ports is partially or entirely impeded. These pockets reduce the cross sectional area available for liquid flow, increasing the flow velocity and associated friction, thereby acting like a restriction in the passage, and reducing the flow. This may create a nonuniform and discontinuous distribution of liquid to the bed. As described above, this can have various adverse consequences, such as changing the nature or type of biological growth in that area of the bed and thereby decreasing treatment efficiency. Also, when gas accumulates into a sufficiently large pocket, it can escape in a rapid, forceful manner into the bed, causing the media to excessively collide and abrade, dislodging the biological growth and thereby decreasing treatment efficiency and allowing solids to escape with the reactor effluent from which they are normally segregated. The problem of evolved gas collecting and disrupting liquid distribution and bed reactions has long been recognized, but prior art has not satisfactorily solved the problem.

An example of a typical flow distributor is provided in U.S. Pat. No. 4,202,774, issued May 13, 1980, to Kos for a flow distributor for introducing a liquid stream in a uniform, non-turbulent fashion to a fluidized bed reactor. Kos U.S. Pat. No. 4,202,774 includes a tank and a flow distributor adjacent the lower end of the tank. The flow distributor includes a liquid inlet which is manifolded to a plurality of T-joints which are in turn each connected to a nippled supply tube having ports in the bottom portion thereof for delivering the liquid into the tank. One method for venting gas is disclosed in Kos U.S. Pat. No. 4,202,774, and that is to pass collected gas through a vent tube port located in the upper region of the liquid conveying passage into a vent tube extending through a wall of the reactor vessel to atmosphere or other apparatus, such as a gas treatment apparatus. Such external venting method has several associated disadvantages. For example, it requires passing the gas through vent tube ports in the wall of the supply tube and the vessel wall. This introduces costs of preparing such vent tube ports and vent tubes, and creates a risk of leakage of the supply tube at the points where the vent tube port opens through the walls of the supply tube and vessel. Additionally, venting such collected gases to the atmosphere or other apparatus may require additional costs for monitoring the contents or volume of the gas stream.

A second method of venting collected gas is to pass such collected gas through a vent tube port located in the upper portion of the liquid conveying passage into a vent tube which passes the collected gas directly into the fluidized bed, rather than externally. It is known to form a vent tube into an inverted "U" shape to direct the vented gas into the fluidized bed. This method has several associated disadvantages. For example, it requires passing the gas through a port in the wall of the supply tube. This introduces costs of preparing such vent tube ports and vent tubes, and creates a risk of leakage of the supply tube at the point where the vent tube port opens through the wall of the supply tube. Also, directing the vent tube into the reactor bed creates the risk of a "sandblast" effect caused by gas escaping through the vent tube at a high rate and forcefully agitating the bed media. The sandblast effect can have several adverse consequences. First, it can cause the media to excessively collide and abrade, so that the biological growth may be dislodged and lost into the liquid. Second, the sandblast effect may create collisions between agitated media and the wall of the tank, wearing holes in the tank wall. Additionally, directing the vent tube into the reactor bed creates a risk of media backflowing into the flow distributor under certain conditions.

SUMMARY OF THE INVENTION

An advantage of the invention is to provide an apparatus for uniformly distributing liquid containing evolvable and entrained gases to a fluidized bed reactor without additional internal or external vent tube ports and vent tubes to prevent collecting evolved gas in pockets which can temporarily interrupt liquid flow.

The invention provides an apparatus for treating a liquid containing evolvable and entrained gas comprising a vessel for containing a bed of fluidized particulate media and a liquid flow distributor therein that has a manifold means connected to receive the liquid. The manifold means includes a liquid conveying passage having a lower region, and an upper region where any gas that evolves from the liquid can collect. The manifold also includes at least one discharging nozzle means having a nozzle inlet in open communication with the gas-liquid upper boundary region, for receiving liquid, gas or a mixture of liquid and evolved gas from the upper boundary region, and a nozzle outlet for uniformly discharging said mixture from said discharging nozzle means into said bed when said distributor is in use. Preferably the nozzle outlet is directed downwards into the bed.

The invention also provides a method for treating a liquid containing evolvable and entrained gas comprising the steps of providing a reactor vessel having a bed; introducing said liquid into a liquid conveying passage of manifold means having a lower region wherein liquid predominates and an upper region wherein evolved gas can collect; providing discharging nozzle means having a nozzle means in open communication with said upper region and introducing liquid, evolved gas, or a mixture thereof from said upper region to avoid gas coalescing into large pockets; passing said liquid, gas or mixture generally downward through a nozzle outlet into said reactor; and passing said liquid, gas or mixture through said reactor to treat said liquid; and removing treated liquid from said reactor.

BRIEF DESCRIPTION OF THE DRAWINGS

FIG. 1 is a side view, partially in section, of a reactor having a liquid flow distributor therein.

FIG. 2 is an enlarged elevational isometric projection view of a portion of the flow distributor shown in FIG. 1.

FIG. 3 is a partial cross-sectional view of the flow distributor taken generally along line 3—3 in FIG. 2.

FIG. 4 is an enlarged partial cross-sectional view of the flow distributor taken generally along line 4—4 in FIG. 2.

DESCRIPTION OF THE PREFERRED EMBODIMENT

Referring to FIG. 1, a preferred embodiment of the invention preferably includes a reactor 10, comprising a reactor vessel 20 containing a bed of particulate media 30, and liquid flow distributor 40 mounted therein having manifold means 50. The reactor vessel 20 has a liquid inlet 60 for the liquid to be treated 70, and a liquid outlet 80 for the treated liquid 90. Liquid flow distributor 40 is connected to receive liquid 70 from liquid inlet 60 and supply said liquid 70 to bed 30.

Referring to FIG. 2, manifold means 50 preferably includes a main header 100 connected by downcomer conduits 110 to a plurality of lateral headers 120, each of which have one or more discharging nozzle means 130. The main headers 100 and lateral headers 120 include main header ends 140 and lateral header ends 150 at the respective opposite ends of each. Main header 100 and lateral headers 110 preferably are circular or square in cross-section, but other cross-sectional configurations can be used.

Referring to FIG. 4, main header 100 preferably includes first upper wall portion 160 spaced above a first lower wall portion 170, to define a first liquid conveying passage 180 therebetween. First liquid conveying passage 180 includes a first upper region 190 wherein gas 200 that may evolve from the liquid can collect and a first lower region 210 which will, during normal operation, contain predominantly liquid 70 therein. A first gas-liquid boundary interface or region 220 will exist between the liquid 70 and any evolved gas 200.

Referring to FIG. 3, each lateral header 120 includes a second upper wall portion 230 spaced above a second lower wall portion 240, defining second liquid conveying passage 250 therebetween. Second liquid conveying passage 250 preferably includes second upper region 260 where gas 200 can collect and second lower region 270 which will have in normal operation liquid 70 therein, defining a second gas-liquid boundary region 280 therebetween. The downcomer conduit 110 constitutes a transfer means 290 which will, in normal operation, convey primarily liquid 70 and also evolved gas 200, or a mixture 350 of liquid 70 and gas 200. Transfer means 290 includes transfer tubular member 300 which may include a tubular riser portion 310 located generally above first lower wall portion 170, and a tubular lower portion 320 extending through the first lower wall portion 170 to the lateral header 120. Referring to FIG. 2, preferably each penult lateral downcomer 110A includes a tubular riser portion 310. Referring again to FIG. 3, transfer tubular member 300 includes transfer inlet 330 and transfer outlet 340 at opposite ends thereof. At least one transfer inlet 330 and preferably each transfer inlet 330 is in open communication with the first upper region 220 for receiving a liquid 70, evolved gas 200 or a mixture thereof 350. Transfer outlet 340 of transfer means 290 is in open communication with said second liquid conveying passage 250.

As shown in FIGS. 3 & 4, discharging nozzle means 130 each preferably include a nozzle tubular member 360 having a nozzle inlet 370 and nozzle outlet 380 at opposite ends thereof. At least one of the nozzle means 130 in each lateral 120 includes a nozzle tubular riser portion 390 extending above second lower wall portion 240. All of the nozzle means 130 include a nozzle tubular lower portion 400 extending below said second lower wall portion 240. The nozzle inlets 370 on nozzle riser portion 290 are in open communication with said second upper region 260. The nozzle inlets 370 of non-riser nozzles 130 are in open communication with lower region 270. The nozzle outlets 380 of all nozzles 130 are in open communication with bed 30 in a generally downward direction from said second liquid conveying passage 250.

A preferred embodiment of the invention includes a method for treating a liquid 70 containing evolvable and entrained gas, preferably comprising the steps of providing a reactor vessel 20 having a bed 30 of particulate media and a liquid receiving manifold means 50; introducing the liquid 70 into a liquid conveying passage 180 of the manifold means 50 having a lower region 210 wherein liquid predominates and an upper region 190 wherein any evolved gas 200 can collect; providing discharging nozzle means 130 in the manifold means 50 having a nozzle inlet 370 in open communication with the upper region 190, and introducing liquid 70, gas 200 or a mixture thereof 350 into the nozzle inlet 370; passing the liquid 70, gas 200, or mixture 350 generally downward through nozzle outlet 380 into the bed 30 of said reactor 10; passing the liquid 70, gas 200 or mixture 350 through the bed 30 of reactor 10 to treat said liquid 70; and removing treated liquid 90 from the reactor 10.

An apparatus and method according to the invention preferably operates so that liquid to be treated 70 containing evolvable and entrained gas enters manifold means 50 of liquid flow distributor 40 through liquid inlet 60. Said liquid 70 preferably enters first liquid conveying passage 180 defined between first upper wall portion 160 and first lower wall portion 170 of main header 100. Any evolved gas will collect in the first upper region 190, and the first lower region 210 will have predominantly liquid 70 therein. A first gas-liquid boundary region or interface 220 will exist that moves up and down depending on the amount of evolved gas present at any given time, but generally this interface will be at or above inlet 330. A first mixture 350 of liquid 70 and collected gas 200 passes generally downward through transfer inlet 330, transfer tubular member 300 and transfer outlet 340 of mixture transfer means 290, into second liquid conveying passage 250 of each lateral header 120 where it becomes a second mixture 410. As previously explained, the second liquid conveying passage 250 has a second upper region 260 where evolved gas 200 can collect, and a second lower region 270 which will have predominantly liquid 70 therein, and a second gas-liquid boundary or interface region 280 therebetween. The second mixture 410 of liquid 70 and any collected gas 200 passes from upper region 280 through nozzle inlet 370, generally downward through nozzle tubular member 360 and out of nozzle outlet 380 into bed 30. As shown in FIG. 1, a resulting treatment mixture 420, that comprises liquid 70 and any gas 200 that has evolved, passes through bed 30 of reactor 10 and out of reactor 10 through outlet 80.

The provision of downcomer inlets 330 that are in open communication with the first upper region 220 and nozzle inlets 370 that are in open communication with the second upper region 260 will serve to continuously collect and pass small amounts of evolved gas 200 almost simultaneously with its evolution and disperse it in a gentle nondisruptive manner into the bead. No large pockets of evolved gas 200 that could interrupt the continuous flow of liquid into the bed will collect.

I claim:

1. A flow distributor for receiving and dispensing a liquid containing dissolved gas into a bed of particulate media contained in a tank, said flow distributor comprising:

a manifold means connectable to a supply of incoming liquid, said manifold means being constructed and arranged to extend into the tank, said manifold means defining a first liquid conveying passage having a lower region and an upper region above said lower region where gas can collect, and said manifold means including a main header defining a second liquid conveying passage having upper and lower regions, a lateral header vertically spaced from said main header, said lateral header defining said first liquid conveying passage, and a transfer means connected between said main header and said lateral header, said transfer means including an upper tubular portion extending upwardly into said upper region of said second liquid conveying passage, and said upper tubular portion of said transfer means having an inlet communicating directly with said upper region of said second liquid conveying passage, and an outlet communicating with said first liquid conveying passage; and at least one discharging nozzle means connected to said manifold, said at least one discharging nozzle means including an upper tubular portion, said upper tubular portion of said at least one discharging nozzle means extending upwardly into said upper region of said second liquid conveying passage, and said upper tubular portion of said at least one discharging nozzle means having an inlet communicating directly with said upper region of said second liquid conveying passage, and said at least one discharging nozzle means including a lower tubular portion having an outlet for discharging the liquid and gas downwardly, said lower tubular portion of said at least one discharging nozzle means extending from said lateral header.

2. A reactor apparatus for treating a liquid containing dissolved gas, said reactor apparatus comprising:

a vessel containing a bed of particulate media, said vessel having an input for the liquid to be treated therein and an output, the liquid flowing upwardly through said bed of particulate media from said input to said output;

a liquid flow distributor mounted in said vessel, said liquid flow distributor including a manifold means connected to said input to receive liquid from said input and to introduce the liquid into said bed of particulate media to react with said particulate material, said manifold means including a first header defining a liquid conveying passage having a lower region and an upper region in which dissolved gas that evolves from the liquid can collect, a second header defining a liquid conveying passage having upper and lower regions, said first header being spaced below said second header, a transfer means connected between said first and second headers, said transfer means having an inlet in open communication with said upper region of said liquid conveying passage of said second header, and an outlet communicating with said liquid conveying passage of said first header, and at least one discharging nozzle means extending downwardly from said first header, said at least one discharging nozzle means having an inlet extending upwardly into said upper region of said liquid conveying passage of said first header, said inlet being in open communication with said upper region of said liquid conveying passage of said first header so that gas in said upper region of said liquid conveying passage of said first header is discharged with said liquid into said bed of particulate media, and said at least one discharging nozzle means having an outlet.

3. A liquid treatment apparatus comprising a tank, and a liquid flow distributor extending into said tank for introducing liquid into said tank, said liquid flow distributor being connectable to a source of liquid, and said liquid flow distributor including a first header, said first header defining a liquid conveying passage having an upper region in which gas can accumulate, and a lower region, a tubular member for discharging liquid from said liquid conveying passage of said first header, said tubular member for discharging liquid from said liquid conveying passage of said first header extending downwardly from said first header and including an upper portion extending through said first header and into said upper region of said liquid conveying passage of said first header, and a second header above said first header, said second header defining a liquid conveying passage having a upper region and a lower region, and a tubular member connected between said first and second headers for discharging liquid from said second header into said first header, said tubular member for discharging liquid from said second header into said first header including an upper portion extending upwardly through said second header and into said upper region of said liquid conveying passage of said second header.

4. A fluid bed reactor apparatus comprising a reactor vessel containing a media bed, and a liquid flow distributor extending into said reactor vessel, said liquid flow distributor including a tubular lateral header defining a liquid conveying passage, said liquid conveying passage of the lateral header including an upper region and a lower region, and said lateral header including an upper end portion defining said upper region, and a lower end portion defining said lower region, and a plurality of nozzles for introducing liquid into said reactor vessel so that the liquid flows upwardly through said media bed to react with said media bed, each of said nozzles extending downwardly from said lower end portion of said lateral header, and at least one of said nozzles including a nozzle portion extending upwardly into said upper region of said liquid conveying passage of said lateral header so that gas collected in the upper region of the liquid conveying passage of the lateral header is introduced into the reactor vessel with the liquid, said liquid flow distributor including a tubular main header above said lateral header, said main header defining a liquid conveying passage having an upper region and a lower region, and a conduit extending between said lateral and main headers to introduce liquid from said main header into said lateral header, said conduit extending upwardly into said region of said liquid conveying passage of said main header.

5. A liquid treatment apparatus comprising a tank, and a liquid flow distributor extending into said tank, said liquid flow distributor being connectable to a source of liquid, and said liquid flow distributor including a tubular first header, said first header defining a liquid conveying passage having an upper region in which gas can accumulate, and a lower region, and means for discharging liquid from said liquid conveying passage of said first header into said tank, said means for discharging liquid from said liquid conveying passage of said first header including at least one tubular member extending upwardly through said first header and into said upper region of said liquid conveying passage of said first header, and a plurality of nozzles, each of said nozzles extending downwardly from said first header, at least one of said nozzles including said at least one tubular member extending upwardly into said upper region of said liquid conveying passage of said first header, said liquid flow distributor including a tubular second header above said first header, said second header defining a liquid conveying passage having an upper region and a lower region, and means for discharging liquid from said liquid conveying passage of said second header into said liquid conveying passage of said first header.

6. A liquid treatment apparatus as set forth in claim 5 wherein said flow distributor includes a tubular member which extends between said first and second headers and which extends upwardly into said upper region of said liquid conveying passage of said second header.

* * * * *

UNITED STATES PATENT AND TRADEMARK OFFICE
CERTIFICATE OF CORRECTION

PATENT NO. : 5,584,996
DATED : December 17, 1996
INVENTOR(S) : Pete Petit

It is certified that error appears in the above—identified patent and that said Letters Patent is hereby corrected as shown below:

On title page,
item [22] should read as follows:

[22] Filed: May 19, 1993

Signed and Sealed this

Twenty-fifth Day of March, 1997

*Attest:*

BRUCE LEHMAN

*Attesting Officer*   Commissioner of Patents and Trademarks